(12) United States Patent
Preece

(10) Patent No.: US 7,024,989 B2
(45) Date of Patent: Apr. 11, 2006

(54) ARRANGEMENT TO SUPPORT THE EJECTION OF A CYLINDRICAL BALE

(75) Inventor: David C. Preece, Nottingham (GB)

(73) Assignee: Deere & Company, Moline, IL (US)

( * ) Notice: Subject to any disclaimer, the term of this patent is extended or adjusted under 35 U.S.C. 154(b) by 33 days.

(21) Appl. No.: 10/778,524

(22) Filed: Feb. 16, 2004

(65) Prior Publication Data

US 2004/0250708 A1 Dec. 16, 2004

(30) Foreign Application Priority Data

Feb. 15, 2003 (DE) .................. 103 06 419

(51) Int. Cl.
*B30B 5/04* (2006.01)
*A01D 39/00* (2006.01)

(52) U.S. Cl. .............. 100/87; 100/88; 56/341

(58) Field of Classification Search .......... 100/87, 100/88, 89, 100, 177; 56/341, 344; 414/24.5

See application file for complete search history.

(56) References Cited

U.S. PATENT DOCUMENTS

| | | | | |
|---|---|---|---|---|
| 4,206,587 A | * | 6/1980 | Freimuth et al. ............. | 56/341 |
| 4,483,247 A | * | 11/1984 | Coeffic ......................... | 100/88 |
| 4,889,047 A | | 12/1989 | Ardueser et al. ............. | 100/87 |
| 5,263,410 A | * | 11/1993 | Olin ............................. | 100/88 |
| 6,073,550 A | * | 6/2000 | Goossen et al. .............. | 100/88 |
| 6,240,712 B1 | | 6/2001 | Meijer ......................... | 100/88 |
| 6,672,205 B1 | * | 1/2004 | Viaud ........................... | 100/87 |
| 6,745,680 B1 | * | 6/2004 | Viaud et al. .................. | 100/88 |

FOREIGN PATENT DOCUMENTS

| | | |
|---|---|---|
| DE | 32 34 748 | 3/1984 |
| DE | 32 47 661 | 6/1984 |
| EP | 264328 A1 * | 4/1988 |

* cited by examiner

*Primary Examiner*—Derris H. Banks
*Assistant Examiner*—Jimmy T. Nguyen

(57) ABSTRACT

An arrangement is proposed that responds to the upward movement of a discharge gate, which forms a rear housing section of a baling chamber to the cylindrical bale in such a way that contact elements of the arrangement are pressed into the surface of the cylindrical bale, preferably by means of a servo motor, in order to reliably grasp the cylindrical bale and move it together with the gate until the bale is free of a fixed forward section of the baling chamber.

9 Claims, 3 Drawing Sheets

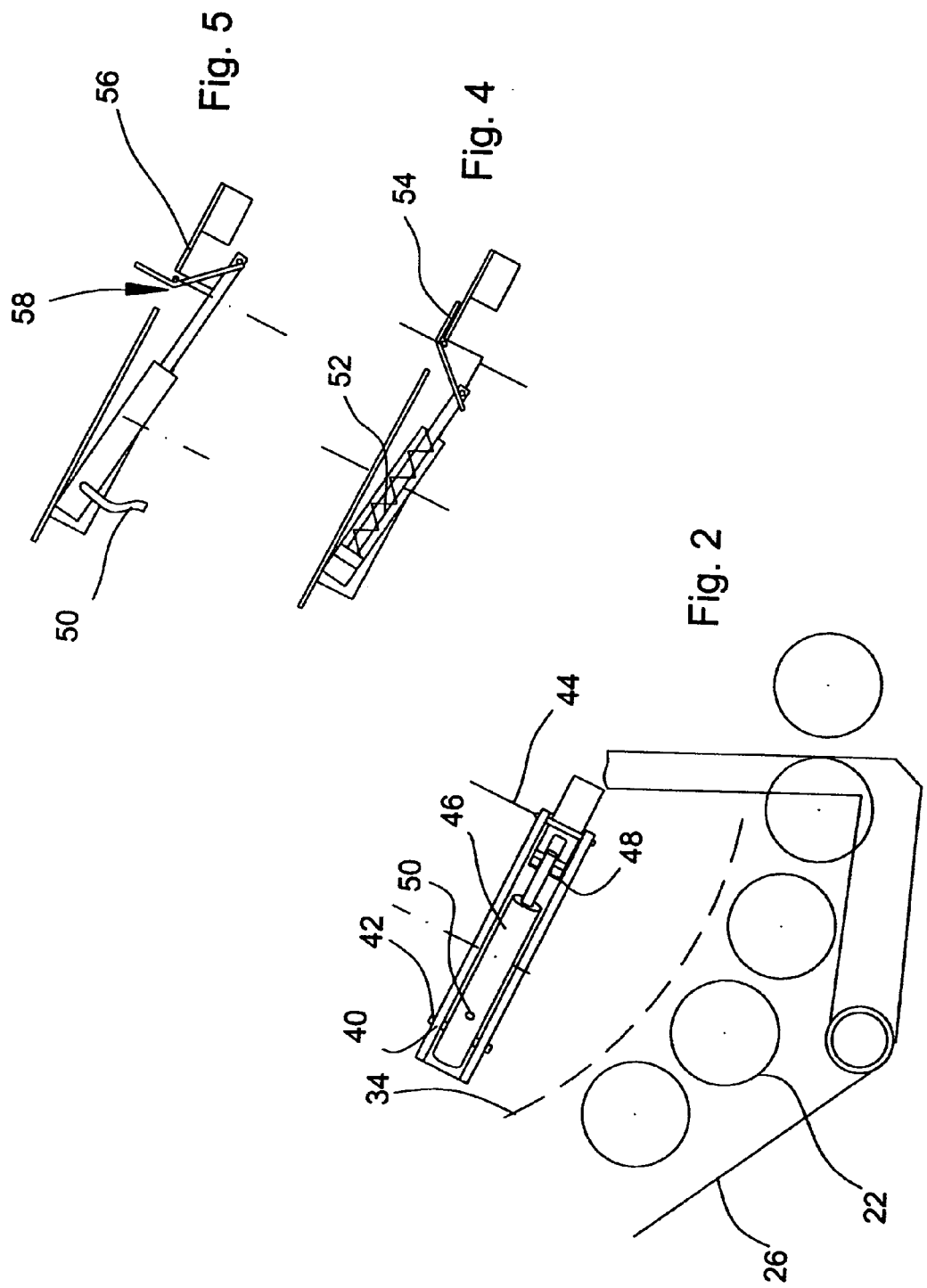

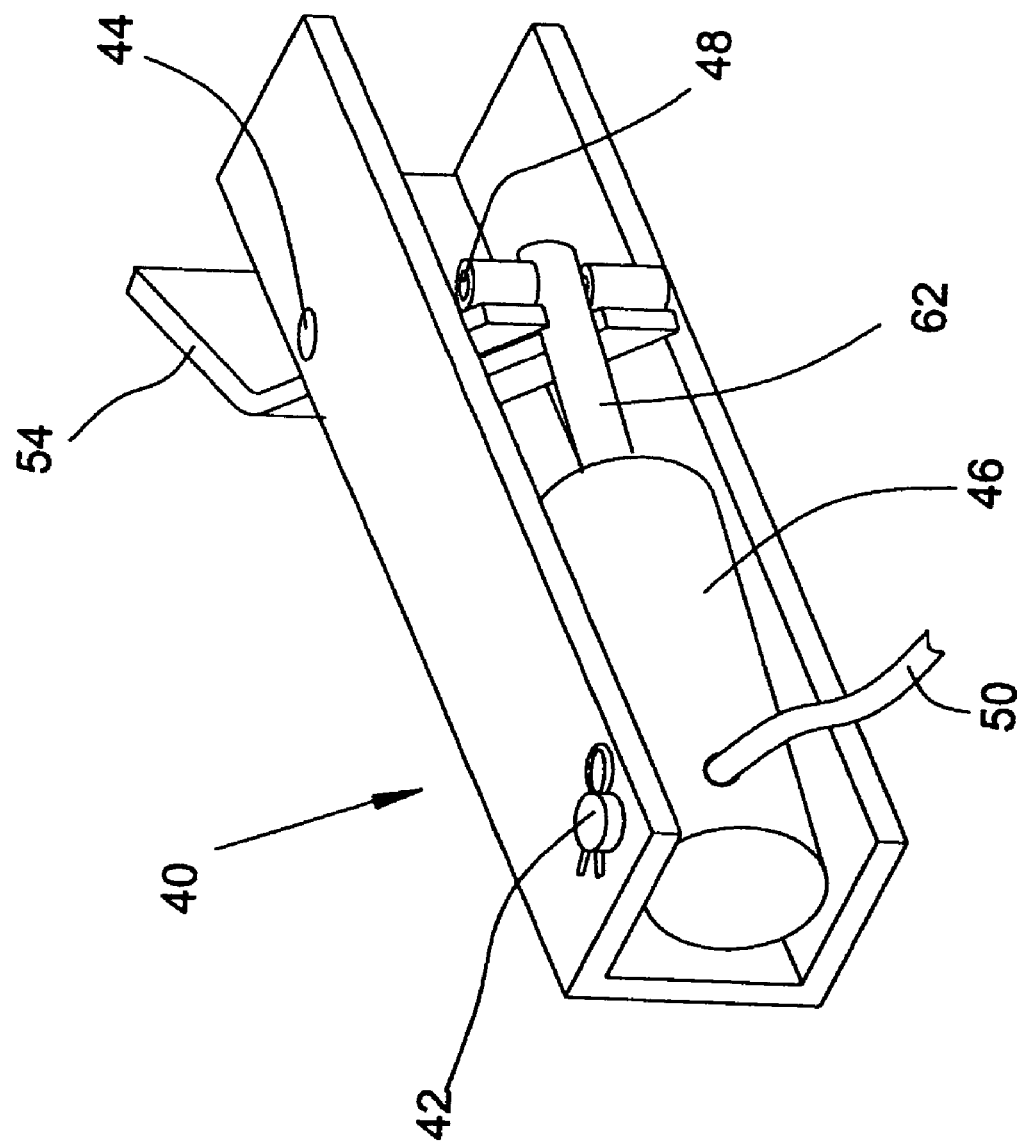

ARRANGEMENT TO SUPPORT THE EJECTION OF A CYLINDRICAL BALE

FIELD OF THE INVENTION

The invention concerns an arrangement to support the ejection of a cylindrical bale from a large round baler and a large round baler equipped with such an arrangement.

BACKGROUND OF THE INVENTION

DE-A1-32 47 661 discloses a large round baler with a plunger that is inserted into the forward housing section when the rear flap is opened, in order to force out a cylindrical bale located in the baling chamber.

DE-A1-32 34 748 reveals a large round baler with plates in the forward lower regions of the inner surfaces of the opposite side walls of a rear discharge gate that should reduce the friction between the cylindrical bale and the forward side walls of the baling chamber as well as increase the friction between the cylindrical bale and the rear side walls, whereby the ejection of the cylindrical bale is to be improved.

The problem underlying the invention is seen in the fact that the first noted arrangement is too costly and the second is too ineffective.

SUMMARY OF THE INVENTION

According to the present invention, there is provided an improved structure for aiding in the discharge of a large round bale from the baling chamber.

An object of the invention is to provide the rear, movable discharge gate section of the baling chamber of a large round baler with a contact element or device used to grasp the cylindrical bale actively, particularly beyond the friction already existing, and to pull it out of the forward housing section. The contact element may be configured selectively and even adjustable in its shape, its ability to pivot and in its contact force or the depth of its penetration, and thereby conform to the weight of the cylindrical bale or to the resistance of the bale to movement. Here consideration must be given to the fact that a bale composed of straw weighs considerably less than a bale composed of silage. The secure grasping of the cylindrical bale also avoids the possibility that the bale remains caught during the ejection on rotating baling components, for example, rollers, and that a net or the like applied to the bale is damaged. The contact element may be configured in the form of a tooth, a tine, a barb, or the like, in such a way that the contact element presses against and penetrates into the end face or circumferential surface of a bale. The adjustment path of the device may amount to approximately 5 cm. to 15 cm. depending on the weight or the resistance to movement of the cylindrical bale. This dimension is selected in such a way that the cylindrical bale is no longer retained by the discharge gate and falls to the ground on the basis of its weight or under some control after a certain path of the discharge gate has been covered that corresponds to a safe movement of the cylindrical bale out of the baling chamber. Such an arrangement can be subsequently applied to existing large round balers after their manufacture or may be integrated into the production of new large round balers.

In its simplest form, the contact element may be configured as a barbed hook that grasps or clamps the cylindrical bale, particularly its end face or circumferential surface, when the discharge gate is raised and thereby carries the bale along. If the movement is performed under outside force, for example, a spring, a motor, or actuated by an operator or as a result of linkages actuated by movement, the force as well as the time of actuation can be influenced or controlled. The surface of the contact element that touches the cylindrical bale may be smooth, coated or even profiled, in order to obtain an optimum contact with the cylindrical bale.

If the contact element can be brought into contact with the cylindrical bale or penetrate the bale by means of a servo motor, the path over which the cylindrical bale is carried along can be controlled extremely well. If necessary, the servo motor may also be moved in both directions so that a net extending partially over both end faces of the cylindrical bale is not damaged when the bale slides out of the discharge gate.

The servo motor may be configured as a hydraulic, pneumatic or electric motor, which depends on the forces that must be transmitted and which sources of force are available.

The clamping or retaining effect can be increased by the provision of several contact elements, for example, one on each side and/or several per side.

If a large round baler is equipped with at least one contact element in at least one side wall of a rear pivoted discharge gate, a reliable emptying of the baling chamber at the end of the baling process is assured.

The use of a common energy source and particularly a common control of the servo motor for the contact element or elements and the discharge gate has several advantages. On the one hand, its own energy source, that is, an additional energy source and/or control arrangement is avoided, which reduces the cost. On the other hand, then an increased contact force can be applied, if both servo motors are included in a series or a parallel circuit and the resistance to movement of the discharge gate is in direct proportion to the weight of the cylindrical bale and its clamping force on the side walls of the discharge gate. Hence, if the cylindrical bale is clamped strongly in the forward housing section of the baling chamber and/or is particularly heavy, then the contact elements will apply increased force to the cylindrical bale or penetrate into it and assure its being carried along by the movable housing section or discharge gate.

The servo motor or motors for the contact elements are supplied together with the servo motors for the movable housing section or discharge gate but may be already deactivated at a point in time at which the first are still actuated. This is possible because the cylindrical bale need be moved only so far that is has been extracted from the forward fixed housing section. The control can be performed by means of a valve, by means of a mechanical overload protection device or the like.

If a wall of the large round baler that engages the contact element is configured in such a way that, in its non-operating position, the contact element does not project appreciably within the inner surface of the wall. This avoids any damage to the surface of the cylindrical bale, the net, the foil or the yarn during the baling process, the binding or the wrapping process.

BRIEF DESCRIPTION OF THE DRAWINGS

The drawing shows an embodiment of the invention that shall be described in greater detail in the following.

FIG. 2 is an enlarged, right side view of the arrangement of FIG. 1 shown in an out-of-service position.

FIG. 3 is an enlarged perspective view of the arrangement of FIG. 2 and showing the arrangement in an operating position.

FIG. 4 is a top view of the arrangement of FIG. 2, but showing the actuator in longitudinal section.

FIG. 5 is a top view of the arrangement of FIG. 2, but showing the arrangement in an operating position.

DESCRIPTION OF THE PREFERRED EMBODIMENT

Figure 1:
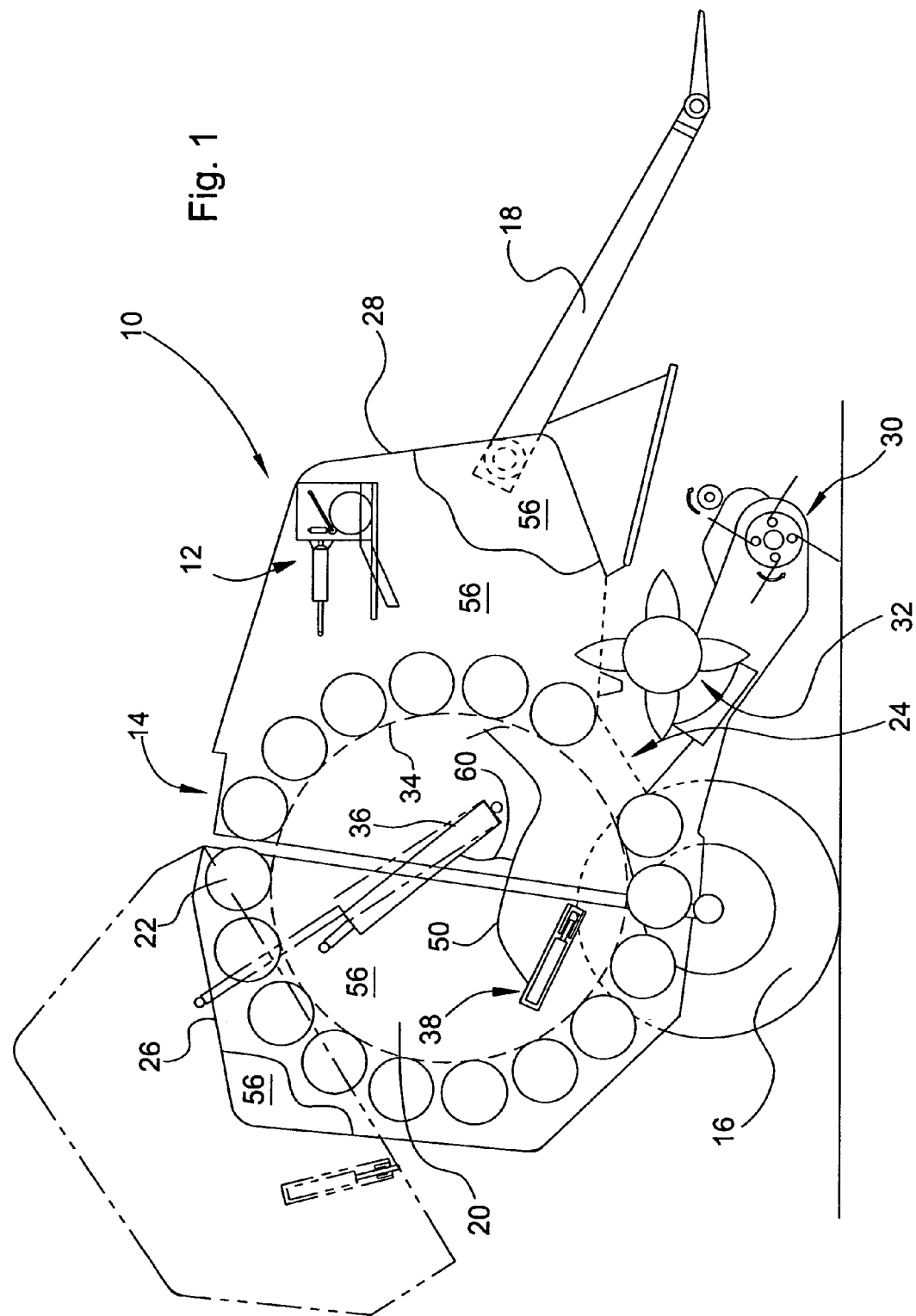
FIG. 1 is a schematic, right side view of a large round baler with an arrangement to aid the ejection of a cylindrical bale from a baling chamber.

Referring now to FIG. 1, there is shown a large round baler 10 with an arrangement 12 for enclosing a cylindrical bale with wrapping material while the bale is located in the large round baler 10.

The large round baler 10 includes a frame 14 that is supported by wheels 16 on the ground and that can be coupled by a towbar 18 to a towing vehicle. A baling chamber 20 is formed in the large round baler 10, with the chamber 20 being defined by a plurality of rollers 22 arranged in a circular pattern. As seen in FIG. 1, an inlet 24 for harvested crop is located at a nearly five o'clock position of the chamber 20 through which harvested crop is supplied. The frame 14 is subdivided into a rear housing section or discharge gate 26 that can be pivoted vertically, and a forward, fixed housing section 28, each of which carries approximately one-half of the rollers 22 arranged around one part of a circle arc. The harvested crop is raised from the ground by means of a pick-up 30 and conveyed to the rear to the harvested crop inlet 24. In this embodiment a cutter head 32 is provided between the pick-up 30 and the harvested crop inlet 24, which, however, is not mandatory in any way. In place of the configuration shown, another could be selected in which the baling chamber 20 is not surrounded by pulleys 22, but by belts, bar chains or a mixture of these two. Therefore the baling chamber 20 may be configured as variable or fixed in its size.

The arrangement 12 is representative of any possible arrangement for enclosing the cylindrical bale with yarn, net, foil or the like.

The baling chamber 20 contains a finished cylindrical bale 34 that is indicated by dashed lines.

Provided at each side of the large round baler 10, for the purpose of raising the discharge gate 26 when a cylindrical bale 34 is to be ejected from the baling chamber 20, is a servo motor 36 which extends between the forward, fixed housing section 28 and the discharge gate 26.

So far the large round baler 10 described here corresponds to a conventional configuration.

Finally, and according to the invention, an arrangement 38 is provided for aiding in the ejection of the cylindrical bale 34 from the baling chamber 20. The arrangement 38 is located in the rear housing section or discharge gate 26 in the lower front region of the discharge gate 26. The arrangement 38 is described in greater detail in the following on the basis of FIGS. 2–5.

The arrangement 38 includes a retainer 40, a first pin 42, a second pin 44, a servo motor 46, a third pin 48, a line 50, an energy accumulator 52 and a contact element 54.

Such an arrangement 38 can be provided a number of times per side or only once on a single side.

The arrangement 38 is attached to the outer side or surface of a side wall 56 of the rear housing section 26, which, for this purpose is provided with an opening 58.

The retainer 40 is defined by an outwardly opening channel member having spaced, parallel legs that are joined to a web fastened to the outer side or surface of the side wall 56, for example, welded. The legs of the channel member are penetrated by two sets of bores, not described in any further detail, that are respectively used to receive the first and the second pins 42 and 44. The bores or openings for the first pin 42 are located in a rear end region of the retainer 40 spaced rearward from the opening 58, and the openings for the second pin 44 are located in the region of the opening 58. The bores are located on axes that extend generally vertically and parallel to the outside of the side wall 56 and parallel to each other. The retainer 40 is formed in such a way that the servo motor 46 can be mounted between its legs, free to move.

The first pin 42 is used as an axle or a shaft and is used to pivotally mount the servo motor 46 to the retainer 40. The pin 42 is secured to the retainer 40 in the usual manner, for example, with cofter pins, threads or the like.

The second pin 44 is configured and secured in the same way as the first pin, but is used for the retention of the contact element 54, so that it can move. Accordingly, the second pin 44 is engaged in bores that are adjacent one edge of the opening 58.

In this embodiment, the servo motor 46 is configured as a single-acting hydraulic motor that is connected to the hydraulic system for the servo motor 36 of the rear housing section or discharge gate 26. An energy accumulator 52 operates in the servo motor 46 which is pictured here as an internal helical compression spring. Since the contact element 54 can alone be brought into its out-of-service position as a function of the orientation of the contact element 54 and the direction of rotation of the cylindrical bale 34, such an energy accumulator 52 is not always required. On the other hand, such an energy accumulator 52 may be configured as a pneumatic device or as an extension spring and/or be located on the outside of the servo motor 46, or it may act upon the contact element 54 or the like. Finally, the servo motor 46 may also be configured as a double-acting servo motor 46, in case this should be required. The only task consists of pulling the contact element 54 out of the baling chamber 20, in case this should become necessary. The servo motor 46 is connected over the line 50 to a line 60 at the servo motor 36, in particular in a parallel circuit; but a connection in a series circuit would also be possible under certain circumstances. The line 50 permits valve controlled pressurized fluid to flow into the servo motor 46, which opposes the energy accumulator 52. The task of the servo motor 46 is to press the contact element 54, that is, its part in the baling chamber 20, into the baling chamber 20 or into the end face of the cylindrical bale 34.

The third pin 48 penetrates a piston rod 62 of the servo motor 46 parallel to the pins 42 and 44 and connects these, free to pivot, with the section of the contact element 54 located outside the baling chamber 20. This pin 48 is also secured in a conventional manner and can be used as an axle or a shaft.

The contact element 54 is configured as a plate that is stiff in bending and is bent approximately at its middle through about 800. The contact element 54 is supported in bearings, free to pivot, in the retainer 40 in the region of the bend by means of the second pin 44. The contact element 54 includes a flat section located in the baling chamber 20, that is engaged on the inner surface of the side wall 56 or in a pocket formed in it, and a section secured on the piston rod 62, free to pivot. The section located in the baling chamber 20 is large enough to be forced into the end face of the cylindrical bale 34 to a depth, for example, of approximately 70 mm. In the region of its bend, the contact element 54 penetrates the opening 58.

On the basis of the foregoing description the arrangement 38 operates as follows.

The arrangement 38 begins with a condition that is shown in FIGS. 1, 2 and 4 and in which a cylindrical bale 34 is finally finished in the baling chamber 20 and awaits its ejection.

Beginning with this condition, pressure is applied to the line 60, so that the associated servo motor 36 extends and pivots the rear housing section 26 upward. On the basis of the connection of the lines 50 and 60, pressure is also applied to the servo motor 46 which thereby separates the contact element 54 from the second pin 44, so that the section located in the baling chamber 20 moves away from the inner surface of the side wall 56 and is forced into the side surface of the cylindrical bale 34. Hence, while the housing section or discharge gate 26 is being raised, the cylindrical bale 34 is grasped by means of the contact element or elements 54 and is pulled out of the forward housing section 28. Thereby the supporting pressure of the cylindrical bale 34 on the rearmost lowest roller 22 of the forward housing section 28 is simultaneously reduced. At the same time, the same pressure is applied to both servo motors 36 and 46. As soon as the cylindrical bale 34 has been pulled out of the forward housing section 28, it can no longer be held by the contact elements 54 and falls to the ground out of the rear housing section 26. In the one case in which the large round baler 10 is provided with a device, not shown, that permits the application of net or foil not only to the circumferential surface but also at least partially to the end face of the cylindrical bale, the servo motor 46 is preferably configured or controlled in such a way that it can withdraw the contact element 54 rapidly when the cylindrical bale 34 begins to slide. In this way any damage to the net or foil applied to the end face of the cylindrical bale 34 is avoided.

Having described the preferred embodiment, it will become apparent that various modifications can be made without departing from the scope of the invention as defined in the accompanying claims.

The invention claimed is:

1. In a large round baler including a baling chamber defined in part by a front pair of fixed side walls and in part by a rearward pair of side walls forming a discharge gate that is mounted to the front pair of fixed side walls for movement between a lowered baling position and a raised bale discharge position, the improvement comprising: at least one arrangement for aiding the ejection of a cylindrical bale from said baling chamber including at least one contact element mounted to one of said rearward pair of side walls of said discharge gate for selective movement between an out-of-service position and an active position located for selectively penetrating an end surface of a cylindrical bale to a depth sufficient to grasp said bale for movement with said discharge gate a distance sufficient for resulting in the ejection of the cylindrical bale from between said front pair of fixed side walls and from said baling chamber.

2. The large round baler, as defined in claim 1, wherein a powered actuator is coupled to said contact element whereby said contact element can be selectively actuated by force.

3. The large round baler, as defined in claim 1, wherein said contact element is mounted for movement towards and away from a said bale located in said baling chamber; and a servo motor being coupled to said contact element for selectively causing said contact member to be engaged with said cylindrical bale.

4. The large round baler, as defined in claim 3, wherein said servo motor is one of a hydraulic, pneumatic or electric motor.

5. The large round baler, as defined in claim 3, wherein a second servo motor is coupled between said a front section of said baling chamber and said discharge gate; and a single source of energy being coupled to said first-mentioned servo motor and said second servo motor.

6. The large round baler, as defined in claim 5, wherein said first-mentioned servo motor is controlled separately from said second servo motor.

7. The large round baler, as defined in claim 1, wherein said contact element is configured in such a way that in its out-of-service condition the contact element does not project an appreciable distance inwardly beyond an inner surface of said side wall of said discharge gate.

8. The large round baler, as defined in claim 7, wherein a lower front region of said side wall of said discharge gate is provided with an opening; said contact element including a flat plate having a bend located between inner and outer ends of said plate; said plate projecting through said opening and being mounted for pivoting about an upright axis located beside an outer surface of said side wall of said discharge gate at a location adjacent said bend; and said flat plate having a section extending between said bend and inner end which lies substantially on said inner surface of said side wall of said discharge gate when said contact element is in said out-of-service position.

9. The large round baler, as defined in-claim 8, wherein said arrangement includes a retainer defined by a channel member having opposite legs joined to and projecting outwardly from a web mounted to said an outer surface of said side wall of said discharge gate at a location adjacent said opening; said plate being located between said legs of said retainer; and said servo motor being an extensible and retractable actuator located between and pivotally coupled to said legs and being pivotally coupled to an outer end of said flat plate.

* * * * *